United States Patent
Shirouzu

(10) Patent No.: US 11,085,509 B2
(45) Date of Patent: Aug. 10, 2021

(54) BENDING MESHING TYPE GEAR DEVICE

(71) Applicant: SUMITOMO HEAVY INDUSTRIES, LTD., Tokyo (JP)

(72) Inventor: Kenji Shirouzu, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/545,284

(22) Filed: Aug. 20, 2019

(65) Prior Publication Data

US 2020/0072318 A1    Mar. 5, 2020

(30) Foreign Application Priority Data

Sep. 4, 2018   (JP) .............................. JP2018-165077

(51) Int. Cl.
| F16H 1/32 | (2006.01) |
| F16H 55/17 | (2006.01) |
| F16H 57/08 | (2006.01) |
| F16H 49/00 | (2006.01) |

(52) U.S. Cl.
CPC .............. *F16H 1/32* (2013.01); *F16H 55/17* (2013.01); *F16H 57/08* (2013.01)

(58) Field of Classification Search
CPC . F16H 1/32; F16H 55/17; F16H 57/08; F16H 49/001; F16H 2049/003; F16H 2049/006; F16H 2049/008
See application file for complete search history.

(56) References Cited

U.S. PATENT DOCUMENTS

| 9,416,861 | B2* | 8/2016 | Ishikawa | F16H 55/0833 |
| 2002/0178861 | A1* | 12/2002 | Kobayashi | F16H 57/041 |
| | | | | 74/640 |
| 2014/0224050 | A1* | 8/2014 | Hofmann | B22D 25/02 |
| | | | | 74/412 R |
| 2018/0031109 | A1* | 2/2018 | Kunugi | B25J 9/1025 |
| 2018/0266533 | A1* | 9/2018 | Tamura | F16H 49/001 |
| 2018/0274646 | A1* | 9/2018 | Sato | F16H 49/001 |
| 2019/0160654 | A1* | 5/2019 | Moritani | B25J 9/0009 |
| 2020/0025277 | A1* | 1/2020 | Tamura | F16H 55/06 |

FOREIGN PATENT DOCUMENTS

| JP | 2013-170611 A | 9/2013 | | |
| JP | 2014020495 A | * 2/2014 | | F16H 1/32 |
| WO | WO-2015156797 A1 | * 10/2015 | | C22C 1/002 |

OTHER PUBLICATIONS

Machine translation of JP2014-20495 filed Feb. 8, 2021 (Year: 2021).*

* cited by examiner

*Primary Examiner* — Tisha D Lewis
(74) *Attorney, Agent, or Firm* — Michael Best & Friedrich LLP

(57) ABSTRACT

A bending meshing type gear device includes a wave generator, an external gear which is bent and deformed by the wave generator, and an internal gear which meshes with the external gear, in which one gear of the external gear and the internal gear is formed of a resin, the other gear of the external gear and the internal gear is formed of a high thermal conductivity material having a thermal conductivity higher than that of the resin and wear resistance higher than that of the resin, and a tooth thickness of the one gear is larger than a tooth thickness of the other gear in a meshing range between the external gear and the internal gear.

10 Claims, 9 Drawing Sheets

BENDING MESHING TYPE GEAR DEVICE

RELATED APPLICATIONS

The content of Japanese Patent Application No. 2018-165077, on the basis of which priority benefits are claimed in an accompanying application data sheet, is in its entirety incorporated herein by reference.

BACKGROUND

Technical Field

Certain embodiments of the present invention relate to a bending meshing type gear device.

Description of Related Art

As a small gear device capable of obtaining a high reduction ratio, a bending meshing type gear device is known. In recent years, applications of the gear devices have been diversified, and thus, weight reduction may be required in this type of bending meshing type gear device. As a response to this requirement, a bending meshing type gear device in which an internal gear and an external gear are formed of a resin is disclosed in the related art.

SUMMARY

According to an embodiment of the present invention, there is provided a bending meshing type gear device including: a wave generator; an external gear which is bent and deformed by the wave generator; and an internal gear which meshes with the external gear, in which one gear of the external gear and the internal gear is formed of a resin, the other gear of the external gear and the internal gear is formed of a high thermal conductivity material having a thermal conductivity higher than that of the resin and wear resistance higher than that of the resin, and a tooth thickness of the one gear is larger than a tooth thickness of the other gear in a meshing range between the external gear and the internal gear.

DETAILED DESCRIPTION

Figure 1:
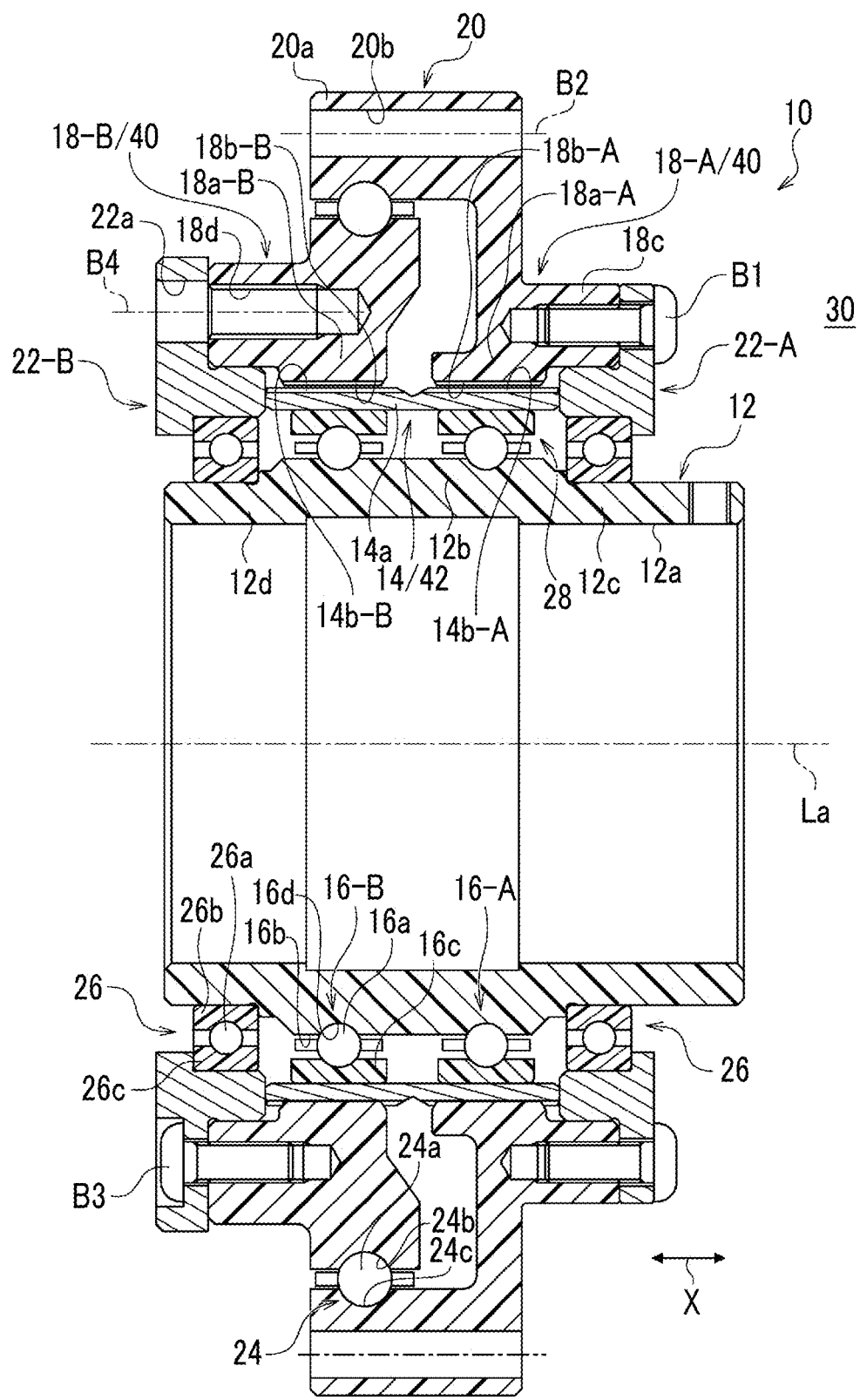
FIG. 1 is a side sectional view showing a gear device of a first embodiment.

Meanwhile, if a gear is formed of a resin, in a case where heat is generated in a meshing location of the gear, there is a concern that a life-span of the gear may decrease due to influences of thermal deterioration. A bending meshing type gear device having a countermeasure with respect to the thermal deterioration has not been proposed yet, and thus, the proposal is desired.

It is desirable to provide a bending meshing type gear device capable of taking a countermeasure with respect to the heat generation in the gear while achieving weight reduction.

According to the bending meshing type gear device of the present invention, it is possible to take the countermeasure with respect to the heat generation in the gear while achieving the weight reduction.

Hereinafter, in embodiments and modification examples, the same reference numerals are assigned to the same components, and repeated descriptions thereof are omitted. In addition, in each drawing, for convenience of explanation, some components are appropriately omitted, or dimensions of the components are appropriately enlarged or reduced. In addition, separate constituent elements which have common points are distinguished by attaching "first, second" or the like at a beginning of a name and "-A, -B" or the like at an end of a code, and when the constituent elements are collectively referred, these are omitted.

First Embodiment

FIG. 1 is a side sectional view showing a gear device 10 of a first embodiment. The gear device 10 is a bending meshing type gear device which rotates an external gear 14 meshing with internal gears 18-A and 18-B while bending and deforming the external gear 14 so as to rotate the external gear 14, and outputs a rotation component. The gear device of the present embodiment is a so-called tubular bending meshing type gear device which decelerates a rotation of a wave generator 12 and outputs the decelerated rotation using a decelerating internal gear 18-A and an output internal gear 18-B.

The gear device 10 mainly includes the wave generator 12, the external gear 14, wave generator bearings 16-A and 16-B, the internal gears 18-A and 18-B, a support member 20, and bearing housings 22-A and 22-B. Hereinafter, a direction along a rotation center line La of the wave generator 12 is simply referred to as an "axial direction X", a circumferential direction around the rotation center line La may be simply referred to as a "circumferential direction", and a radial direction around the rotation center line La may be simply referred to as a "radial direction".

The wave generator 12 is a tubular member having stiffness. A drive shaft (not shown) of a drive device such as a motor is connected to the wave generator 12 using a key or the like. The wave generator 12 includes an axial hole 12a into which a wire or the like is inserted. The wave generator 12 is rotated by the drive shaft with the axis of the wave generator 12 as a rotation center. In addition, the drive device is disposed on one side (right side in FIG. 1) in the axial direction X from the wave generator 12. Hereinafter, the one side in the axial direction X is referred to as an input side and the other side (left side in FIG. 1) is referred to as a counter input side.

The wave generator 12 includes an intermediate shaft portion 12b, an input-side shaft portion 12c which is located on the input side from the intermediate shaft portion 12b, and a counter input-side shaft portion 12d which is located on the counter input side from the intermediate shaft portion 12b. An outer peripheral shape of the intermediate shaft portion 12b in a cross section orthogonal to the axial direction X has an elliptical shape. An outer peripheral shape of each of the input-side shaft portion 12c and the counter input-side shaft portion 12d in the cross section orthogonal to the axial direction X has a circular shape. In the present specification, the "elliptical shape" is not limited to a geometrically exact elliptical shape but includes an approximately elliptical shape.

The external gear 14 is disposed on an outer peripheral side of the intermediate shaft portion 12b of the wave generator 12. The external gear 14 is a tubular member having flexibility. The external gear 14 has a tubular external tooth base portion 14a, and first external teeth 14b-A and second external teeth 14b-B provided on an outer peripheral portion of the external tooth base portion 14a. The first external teeth 14b-A are disposed on the input side in the axial direction X and mesh with the decelerating internal gear 18-A described later. The second external teeth 14b-B are disposed on the counter input side in the axial direction X and mesh with the output internal gear 18-B described later. In the first external teeth 14b-A and the second external teeth 14b-B, both side portions of the intermediate shaft portion 12b of the wave generator 12 in a longitudinal direction mesh with the internal gear 18. The first external teeth 14b-A and the second external teeth 14b-B of the present embodiment are integrally formed with the external tooth base portion 14a, but may be provided separately from the external tooth base portion 14a.

The external gear 14 follows the rotation of the wave generator 12, and the external gear 14 is bent and deformed elliptically via a wave generator bearing 16 by the intermediate shaft portion 12b of the wave generator 12. In this case, the external gear 14 is bent and deformed so as to match a shape of the intermediate shaft portion 12b of the wave generator 12 while changing a meshing position with the internal gear 18-A in the circumferential direction.

The wave generator bearing 16 is disposed between the intermediate shaft portion 12b of the wave generator 12 and the external gear 14. The wave generator bearing 16 includes the first wave generator bearing 16-A which is disposed between the first external teeth 14b-A of the external gear 14 and the wave generator 12, and the second wave generator bearing 16-B which is disposed between the second external teeth 14b-B of the external gear 14 and the wave generator 12. The wave generator 12 rotatably supports the external gear 14 via the wave generator bearing 16.

Each wave generator bearing 16 has a plurality of first rolling elements 16a, a first inner ring 16b, and a first outer ring 16c. Each of the first rolling elements 16a of the present embodiment is a spherical body. The first inner ring 16b of the present embodiment constitutes an outer peripheral surface of the intermediate shaft portion 12b of the wave generator 12, and the outer peripheral surface constitutes an inner ring-side rolling surface 16d on which the first rolling elements 16a roll. Although the first inner ring 16b also functions as the wave generator 12, the first inner ring 16b may be constituted by a member other than the wave generator 12.

The first outer ring 16c of the present embodiment is constituted by a member other than the external gear 14. The first outer ring 16c has flexibility. The first outer ring 16c follows the rotation of the wave generator 12, and the external gear 14 is bent and deformed elliptically via the first rolling elements 16a by the intermediate shaft portion 12b of the wave generator 12.

The internal gear 18 is an annular member having stiffness. The internal gear 18 is disposed on outer peripheral sides of the first external teeth 14b-A or the second external teeth 14b-B of the external gear 14. In the present embodiment, the internal gear 18 includes the decelerating internal gear 18-A (first internal gear) which is disposed on the input side in the axial direction X and an output internal gear 18-B (second internal gear) which is disposed on the counter input side in the axial direction X.

The decelerating internal gear 18-A has a tubular first internal tooth base portion 18a-A and first internal teeth 18b-A provided on an inner peripheral portion of the first internal tooth base portion 18a-A. The first internal teeth 18b-A mesh with the first external teeth 14b-A of the external gear 14. The first internal teeth 18b-A of the present embodiment are integrally formed with the first internal tooth base portions 18a-A, but may be provided separately from the first internal tooth base portions 18a-A.

The number of teeth of the first internal teeth 18b-A is larger than the number of teeth of the first external teeth 14b-A by $2i$ (i is a natural number equal to or greater than 1). Accordingly, when the wave generator 12 rotates, the rotation of the wave generator 12 is decelerated by a reduction ratio corresponding to a difference in the number of teeth between the first internal teeth 18b-A and the first external teeth 14b-A, and the external gear 14 rotates. In addition, the decelerating internal gear 18-A has a connection portion 18c in which a bolt hole into which a bolt B1 is screwed is formed. The bolt B1 is used to connect the decelerating internal gear 18-A to the input-side bearing housing 22-A.

The output internal gear 18-B has a tubular second internal tooth base portion 18a-B and second internal teeth 18b-B provided on an inner peripheral portion of the second internal tooth base portion 18a-B. The second internal teeth 18b-B mesh with the second external teeth 14b-B of the external gear 14. The second internal teeth 18b-B of the present embodiment are integrally formed with the second internal tooth base portions 18a-B, but may be provided separately from the second internal tooth base portions 18a-B.

The number of teeth of the second internal teeth 18b-B is the same as the number of teeth of the second external teeth 14b-B. Accordingly, when the wave generator 12 rotates, a rotation having the same magnitude as that of the rotation component of the external gear 14 is output to the output internal gear 18-B.

The support member 20 has an outer tubular portion 20a which rotatably supports the output internal gear 18-B via a main bearing 24. The outer tubular portion 20a is disposed radially outward of the first internal teeth 18b-A of the decelerating internal gear 18-A. In the present embodiment, the support member 20 and the decelerating internal gear 18-A constitutes a portion of a single member and are integrated with each other. The outer tubular portion 20a includes an insertion hole 20b for inserting a bolt B2 used for connection to an external member. The external member is disposed outside the gear device 10 and has a role of supporting the gear device 10.

The main bearing 24 has a plurality of second rolling elements 24a, a second inner ring 24b, and a second outer ring 24c. Each of the second rolling elements 24a of the present embodiment is a spherical body, but may be a roller or the like. The second inner ring 24b of the present embodiment is constituted by an outer peripheral surface of the output internal gear 18-B, but may be constituted by a member other than the output internal gear 18-B. The second outer ring 24c is constituted by an inner peripheral surface of the outer tubular portion 20a of the support member 20, but may be constituted by a member other than the support member 20.

The bearing housings 22 are spaced apart in the axial direction X of the wave generator 12. The bearing housings 22 include an input-side bearing housing 22-A which is disposed on the input side in the axial direction X and a counter input-side bearing housing 22-B which is disposed on the counter input side in the axial direction X.

The input-side bearing housing 22-A is connected to the decelerating internal gear 18-A by a bolt B1 or the like so as to be integrated with the decelerating internal gear 18-A. The input-side bearing housing 22-A is connected to the decelerating internal gear 18-A and functions as a first abutment member which abuts against an input-side end surface of the external gear 14.

The counter input-side bearing housing 22-B is connected to the output internal gear 18-B by a bolt B3 or the like so as to be integrated with the output internal gear 18-B. The counter input-side bearing housing 22-B is connected to the output internal gear 18-B and functions as a second abutment member which abuts against a counter input-side end surface of the external gear 14.

A bearing 26 is disposed between the input-side bearing housing 22-A and the input-side shaft portion 12c of the wave generator 12 or between the counter input-side bearing housing 22-B and the counter input-side shaft portion 12d of the wave generator 12. The pair of bearing housings 22-A and 22-B rotatably supports the wave generator 12 on both sides via the bearings 26. Each bearing 26 has a plurality of third rolling elements 26a, a third inner ring 26b, and a third outer ring 26c.

The counter input-side bearing housing 22-B and the output internal gear 18-B are coupled to a device to be driven by a bolt B4. The device to be driven is disposed on the counter input side in the axial direction X from the wave generator 12. The counter input-side bearing housing 22-B includes an insertion hole 22a into which a shaft portion of the bolt B4 is inserted. In the output internal gear 18-B, a female screw hole 18d into which the bolt B4 is screwed is formed.

An operation of the above-described gear device 10 will be described. If the drive shaft of the drive device rotates, the wave generator 12 rotates together with the drive shaft. If the wave generator 12 rotates, the external gear 14 is bent and deformed continuously to match the shape of the intermediate shaft portion 12b of the wave generator 12 while changing the meshing position with the internal gear 18 in the circumferential direction. Each time the wave generator 12 rotates once, the external gear 14 rotates relative to the decelerating internal gear 18-A by an amount corresponding to the difference in the number of teeth between the decelerating internal gear 18-A and the first internal teeth 18b-A. In this case, the rotation of the wave generator 12 is decelerated by the reduction ratio corresponding to the difference in the number of teeth between the decelerating internal gear 18-A and the first internal teeth 18b-A, and the external gear 14 rotates. The number of teeth of the second internal teeth 18b-B of the output internal gear 18-B and the number of teeth of the second external teeth 14b-B are the same as each other. Therefore, the output internal gear 18-B synchronously rotates with the same rotation component as that of the external gear 14 while the relative meshing position to the external gear 14 is not changed before and after the wave generator 12 rotates once. The rotation of the output internal gear 18-B is transmitted from the output internal gear 18-B to the device to be driven. As a result, the rotation of the wave generator 12 is decelerated and is output from the output internal gear 18-B to the device to be driven.

Here, the gear device 10 of the first embodiment has the following features. That is, some of the above-described constituent elements are formed of a resin, and the other constituent elements are formed of a high thermal conductivity material described later.

Specifically, in the gear device 10 of the first embodiment, one of the external gear 14 and the internal gear 18 is formed of a resin. In the present embodiment, the internal gear 18 is formed of a resin. More specifically, each of the decelerating internal gear 18-A and the output internal gear 18-B is formed of a resin. Hereinafter, for the sake of convenience, the resin which constitutes one of the external gear 14 and the internal gear 18 is referred to as a resin for gear. For example, here, for the resin for gear, general-purpose engineer plastics such as polyacetal and polyamide are used.

In addition, the external gear 14 which is the other gear of the external gear 14 and the internal gear 18 is formed of a high thermal conductivity material. Specifically, the entirety of the external gear 14, that is, each of the external tooth base portion 14a, the first external teeth 14b-A, and the second external teeth 14b-B is formed of the high thermal conductivity material. This high thermal conductivity material is a material which has thermal conductivity [W/(m·K)] higher than that of the resin for gear. In the present embodiment, metal such as steel or aluminum is used for the high thermal conductivity material. However, any resin may be used as long as it has a thermal conductivity greater than that of the resin for gear.

(A) Accordingly, when heat is generated in the meshing location between the internal gear 18 and the external gear 14, heat transfer from the meshing location to other locations through the external gear 14 formed of the high thermal conductivity material is promoted, and heat dissipation at other locations is promoted. Here, the other locations include not only locations other than the meshing location of the external gear 14 but also a member (in the present embodiment, the bearing housing 22 described later) except for the external gear 14. Accordingly, it is possible to suppress an increase in temperature of the internal gear 18 or the external gear 14 caused by heat generation in the meshing location between the internal gear 18 and the external gear 14. As a result, it is possible to prevent a decrease in a life-span of the internal gear 18 or the external gear 14 due to influences of thermal deterioration, and favorable durability of the internal gear 18 or the external gear 14 can be obtained. Accordingly, one of the external gear 14 and the internal gear 18 is formed of the resin for gear, and thus, it is possible to take a countermeasure with respect to heat generation in the gear while achieving the weight reduction.

From the viewpoint of transferring heat generated in the meshing location of the gear to the other locations, it is preferable that the high thermal conductivity material has the thermal conductivity greater than that of the resin for gear. From this viewpoint, for example, it is preferable that the thermal conductivity of the high thermal conductivity material is set to be 10.0 times or more the thermal conductivity of the resin for gear.

In the bending meshing type gear device 10, in general, the internal gear 18 which is disposed on an outer peripheral side of the external gear 14 has a volume larger than that of the external gear 14. Compared to a case where the external gear 14 having a smaller volume is formed of the resin for gear, in the present embodiment, the internal gear 18 having a larger volume is formed of the resin for gear, and thus, it is possible to effectively achieve the weight reduction.

Meanwhile, an accommodation space 28 in which the external gear 14 is accommodated is formed between the internal gear 18 and the external gear 14 and is located at a deep location away from an external space 30 around the gear device 10. Therefore, air cannot easily flow between the accommodation space 28 of the external gear 14 and the external space 30, and heat dissipated from the external gear 14 is easily accumulated in the accommodation space 28. In particular, this accommodation space 28 is formed in a portion sandwiched from both sides of the axial direction X by the bearing housings 22 and the bearings 26, and thus, heat is more easily accumulated in the accommodation space 28. Next, a device for promoting the heat dissipation of the external gear 14 located at a location where heat is easily accumulated will be described.

As described above, the input-side bearing housing 22-A or the counter input-side bearing housing 22-B functions as the abutment member abutting against the external gear 14. A portion of each bearing housing 22 is exposed to the external space 30. For example, here, a portion is a surface of the bearing housing 22 facing outward in the axial direction X or a radially outward outer peripheral surface of the bearing housing 22. The bearing housing 22 is formed of a high thermal conductivity material having thermal conductivity higher than that of the above-described resin for gear. In the present embodiment, as this high thermal conductivity material, a metal having the same thermal conductivity as that of the external gear 14 is used. However, a specific example of the high thermal conductivity material is not particularly limited as long as it has the thermal conductivity larger than that of the resin for gear. For example, the bearing housing 22 may be formed of a material different from that of the external gear 14.

Accordingly, the heat of the external gear 14 can be transferred to the bearing housing 22 which abuts against the external gear 14, and the heat of the external gear 14 can be dissipated from the bearing housing 22. Therefore, an increase in the temperature of the internal gear 18 or the external gear 14 can be further suppressed by increasing the number of dissipation locations of the heat generated at the meshing location of the gear. In particular, the heat dissipation can be performed from the bearing housing 22 to the surrounding external space 30, heat dissipation from the external gear 14 disposed in the accommodation space 28 to the external space 30 is promoted, and the increase in the temperature of the internal gear 18 or external gear 14 can be effectively suppressed.

Moreover, in the gear device 10 of the present embodiment, in order to achieve the weight reduction, each of the first outer ring 16c of the wave generator bearing 16, the third outer ring 26c and the third inner ring 26b of the bearing 26, and the wave generator 12 are formed of a resin. These may be formed of the resin for gear having the same thermal conductivity as that of the internal gear 18, or may be formed of a different resin. Each of the first rolling element 16a of the wave generator bearing 16, the second rolling element 24a of the main bearing 24, and the third rolling elements 26a of the bearing 26 is formed of a metal. This is because the rolling element of the bearing requires a strength larger than those of the outer and inner rings.

In addition, since the support member 20 constitutes a portion of the same single member as the decelerating internal gear 18-A, similarly to the decelerating internal gear 18-A, the support member 20 is formed of the resin for gear.

Moreover, in addition to this, the gear device 10 of the present embodiment includes the bolts B1 and B3 for connecting a member formed of a resin and another member. In this embodiment, a combination of the "member formed of a resin" and "another member" is a combination of the decelerating internal gear 18-A and the input-side bearing housing 22-A, or a combination of the output internal gear 18-B and the counter input-side bearing housing 22-B.

Similarly to the external gear 14 or the like, each of the bolts B1 and B3 is formed of a metal which is the high thermal conductivity material. Accordingly, even in a member formed of a resin having a small amount of heat dissipation, the heat dissipation through the bolts B1 and B3 formed of the high thermal conductivity material can be promoted, and thus, it is possible to suppress thermal deterioration of the member. In addition, in the present embodiment, from the viewpoint of promoting the heat transfer and the heat dissipation, the example in which "another member" is formed of the high thermal conductivity material is described. However, "another member" may be formed of the resin for gear.

Meanwhile, in a case where a resin gear is used, wear resistance of the resin is lower than that of the metal or the like, and thus, wear on a tooth surface becomes a problem. If the wear on the tooth surface progresses, the wear causes breakage of the tooth, and thus, a countermeasure for the wear is required. Hereinafter, a device for realizing this countermeasure will be described.

In the present embodiment, wear resistance of the high thermal conductivity material constituting the external gear 14 which is "the other gear" described above is higher than that of the resin for gear constituting the internal gear 18 which is the "one gear". Hereinafter, the "one gear" is referred to as a resin gear 40 and the "other gear" is referred to as a high wear resistance gear 42. All the "high thermal conductivity materials" described in the present specification refer to materials having wear resistance higher than that of the resin for gear. For the high thermal conductivity material which satisfies such conditions, a metal such as iron and aluminum as described above is used. However, resins or the like different from the resin for gear may be used.

Here, the "wear resistance being high" refers to a specific amount of wear being small when a mating member other than a mentioned gear slides on the gear by a wear test under the same sliding condition. That is, a specific amount of wear of the high thermal conductivity material constituting the high wear resistance gear 42 is a smaller than that of the resin for gear constituting the resin gear 40. This wear test is performed by measuring a wear amount when the mating member slides on a sliding surface of a sample cut out from the gear. The "same sliding condition" means that surface roughness of the sliding surface of the sample or the mating member and the materials of the mating member are the same as each other and lubricating conditions such as presence or absence of a lubricant and a composition of the lubricant are the same as each other. The specific amount of wear [$mm^2$/kgf] is expressed by the following Expression (1) using a load [kgf] applied perpendicularly to the sliding surface, a sliding distance [mm] when the mating member slides on the sliding surface in a state where the load is applied to the sliding surface, and a wear amount [$mm^3$] of the sample caused by the sliding.

$$\text{Specific amount of wear} = \text{wear amount}/(\text{sliding distance} \times \text{load}) \qquad (1)$$

Figure 2:
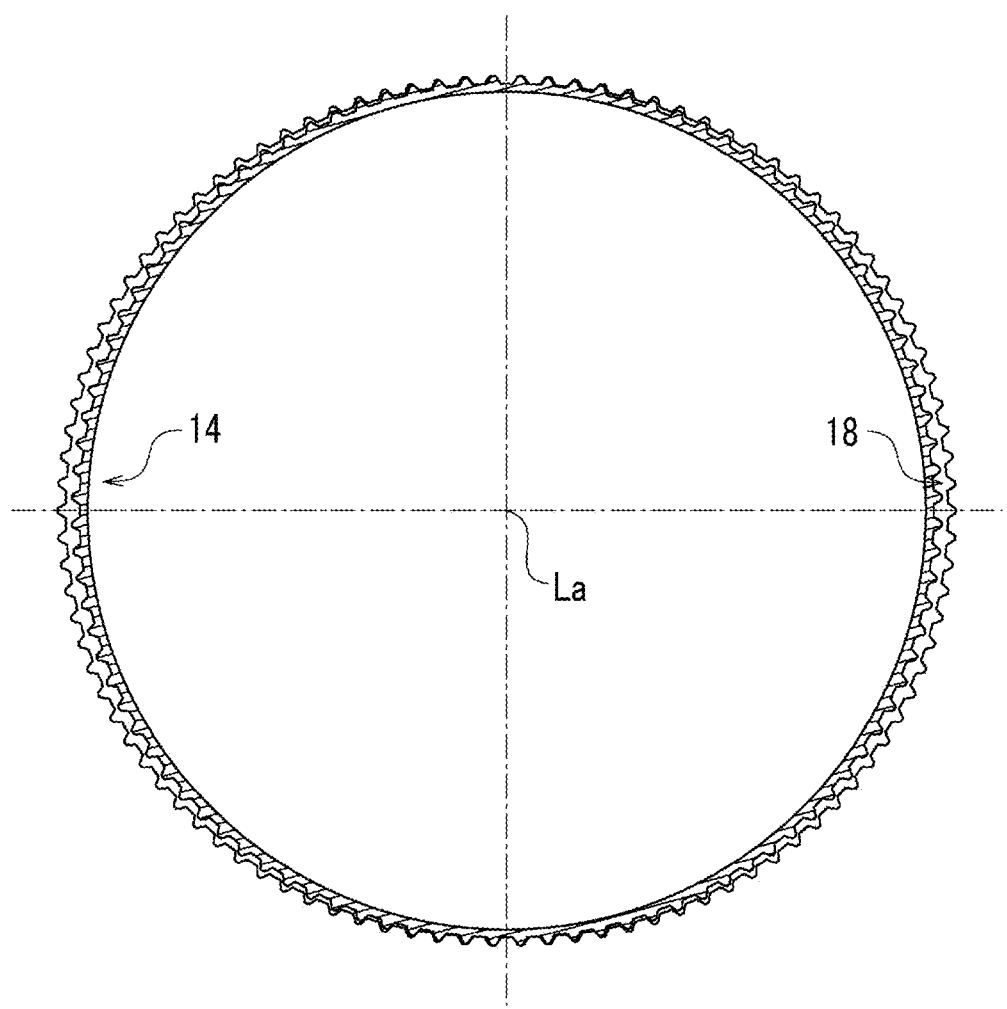
FIG. 2 is a view when a portion of an internal gear and an external gear of the first embodiment are viewed in an axial direction.
Figure 3:
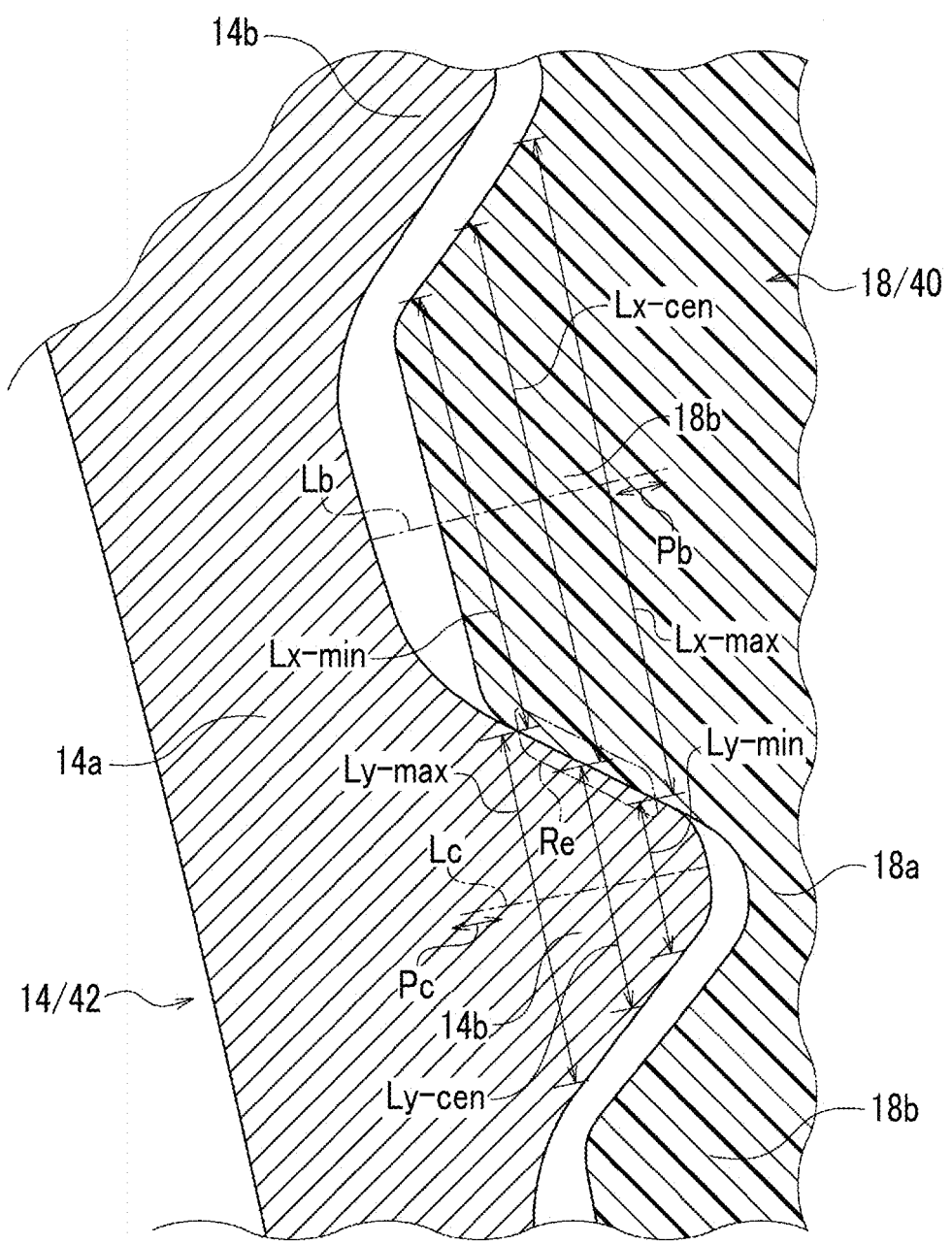
FIG. 3 is an enlarged view of FIG. 2.

FIG. 2 is a view when a portion of the internal gear 18 and the external gear 14 are viewed in the axial direction, and FIG. 3 is an enlarged view of FIG. 2. In the present embodiment, in a meshing range Re between the external gear 14 and the internal gear 18, a tooth thickness of the resin gear 40 is larger than a tooth thickness of the high wear resistance gear 42. Here, the "meshing range Re" refers to a range in which the tooth surfaces of the external gear 14 and the internal gear 18 come into contact with each other when the external gear 14 and the internal gear 18 mesh with each other.

A direction along a radius line Lb passing through a circumferential center position of an internal tooth 18b of the internal gear 18 and the rotation center line La (refer to FIG. 2) of the wave generator 12 is referred to as a tooth length direction Pb of the internal tooth 18b. The tooth thickness of the internal gear 18 refers to a dimension of the internal tooth 18b in a direction orthogonal to the tooth length direction Pb and a tooth trace direction (axial direction X) of the internal tooth 18b. The tooth thickness of the external gear 14 refers to a dimension based on when the external gear 14 is externally fitted to a true circular core (not shown) having a diameter capable of being externally fitted over the bending deformable external gear 14 without loosening. Under the conditions of this reference, a direction along a radial line Lc passing through a circumferential center position of an external tooth 14b of the external gear 14 and the center of the core is referred to as a tooth length direction Pc of the external tooth 14b. The tooth thickness of the external gear 14 refers to a dimension of the external tooth 14b in a direction orthogonal to the tooth length direction Pc and the tooth trace direction (axial direction X) of the external tooth 14b under the condition of this reference.

Here, "the tooth thickness of the resin gear 40 is larger than the tooth thickness of the high wear resistance gear 42" means that any one of conditions (1) to (3) described below is satisfied. In the present embodiment, all the conditions of (1) to (3) are satisfied, but any one of the conditions may be satisfied.

(1) In the above-described meshing range Re, a minimum value Lx-min of the tooth thickness of resin gear 40 is larger than a minimum value Ly-min of the tooth thickness of the high wear resistance gear 42.

(2) At the center position of the above-described meshing range Re in the tooth length direction, a tooth thickness Lx-cen of the resin gear 40 is larger than a tooth thickness Ly-cen of the high wear resistance gear 42.

(3) In the above-described meshing range Re, a maximum value Lx-max of the tooth thickness of the resin gear 40 is larger than a maximum value Ly-max of the tooth thickness of the high wear resistance gear 42.

The condition of (1) being satisfied means that the tooth thickness of the resin gear 40 is larger than the minimum value Ly-min of the tooth thickness of the high wear resistance gear 42 in the entire meshing range Re.

Accordingly, in the meshing range Re between the external gear 14 and the internal gear 18, compared to a case where the tooth thickness of the resin gear 40 is the same as the tooth thickness of the high wear resistance gear 42, the strength of the tooth when the tooth surface of the tooth (in the present embodiment, the internal tooth 18b) of the resin gear 40 is worn is easily secured. Accordingly, it is possible to reduce a breakage risk of the tooth of the resin gear 40, and a long life-span of the gear device 10 is achieved.

In a case where the resin gear is used, stiffness of a resin is lower than that of a metal, an amount of bending deformation of the tooth due to a load applied to a tooth contact location of the resin gear 40 increases. This causes a meshing error and ratcheting (tooth jump) between the resin gear 40 and the high wear resistance gear 42. In this regard, according to the present embodiment, the tooth thickness of the resin gear 40 is larger than the tooth thickness of the high wear resistance gear 42. Therefore, in the meshing range Re between the external gear 14 and the internal gear 18, compared to the case where the tooth thickness of the resin gear 40 and the tooth thickness of the high wear resistance gear 42 are the same as each other, high stiffness of the tooth of resin gear 40 can be achieved, and the amount of bending deformation of the tooth can decrease. Accordingly, the meshing error between the resin gear 40 and the high wear resistance gear 42 can be reduced, and the ratcheting can be suppressed by an improvement of a ratcheting torque.

In particular, in the present embodiment, the condition of (1) described above is satisfied, and thus, the above-described various effects can be more easily obtained in a range including a location having the minimum value in the meshing range Re. Here, the above-described various effects are an effect of more easily obtaining the strength of the tooth when the tooth surface of the resin gear 40 wears, an effect of reducing the meshing error, and an effect of suppressing the ratcheting. From the viewpoint of more easily obtaining these effects, in the above-described meshing range Re, preferably, the minimum value Lx-min of tooth thickness of the resin gear 40 is set to be 2.5 times or more the minimum value Ly-min of the tooth thickness of the high wear resistance gear 42.

In the present embodiment, the condition of (2) described above is satisfied, the above-described various effects can be easily obtained in a wide range in the tooth length direction including the location having the center position of the meshing range Re. From the viewpoint of more easily obtaining these effects, at the center position of the above-described meshing range Re in the tooth length direction, preferably, the tooth thickness Lx-cen of the resin gear 40 is set to be 1.6 times or more the tooth thickness ly-cen of the high wear resistance gear 42.

In the present embodiment, the condition of (3) described above is satisfied, the above-described various effects can be easily obtained in a range including the location having the maximum value in the meshing range Re.

In the present embodiment, in the above-described meshing range Re, the minimum value Lxmin of the tooth thickness of the resin gear 40 is equal to or more than the maximum value Ly-max of the tooth thickness of the high wear resistance gear 42. This means that the tooth thickness of the resin gear 40 is larger than the maximum value Ly-max of the tooth thickness of the high wear resistance gear 42 in the entire meshing range Re. Accordingly, the above-described various effects are more easily obtained in the entire meshing range Re.

The high thermal conductivity material which constitutes the high wear resistance gear 42 is metal and has stiffness larger than the resin which constitutes the resin gear 40. Therefore, as described above, even if the tooth (in the present embodiment, the internal tooth 18b) of the resin gear 40 has high stiffness due to an increase in the tooth thickness, it is possible to obtain the above-described various effects while suppressing an adverse effect on the metal high wear resistance gear 42 (in the present embodiment, the external tooth 14b).

The resin gear 40 is the internal gear 18, the high wear resistance gear 42 is an external gear 14, and the tooth thickness of the internal gear 18 is larger than the tooth thickness of the external gear 14. Accordingly, compared to a case where the thickness of the external gear 14 is the same as the thickness of the internal gear 18, as the tooth thickness of the external gear 14 is reduced to the tooth thickness of the internal gear 18, a volume of the external tooth 14b of the external gear 14 is reduced, and a force required for the bending deformation of the external gear 14 can be reduced. Accordingly, it is possible to avoid an energy loss accompanying the bending deformation of the external gear 14, and to achieve high transmission efficiency of the gear device 10.

Second Embodiment

Figure 4:
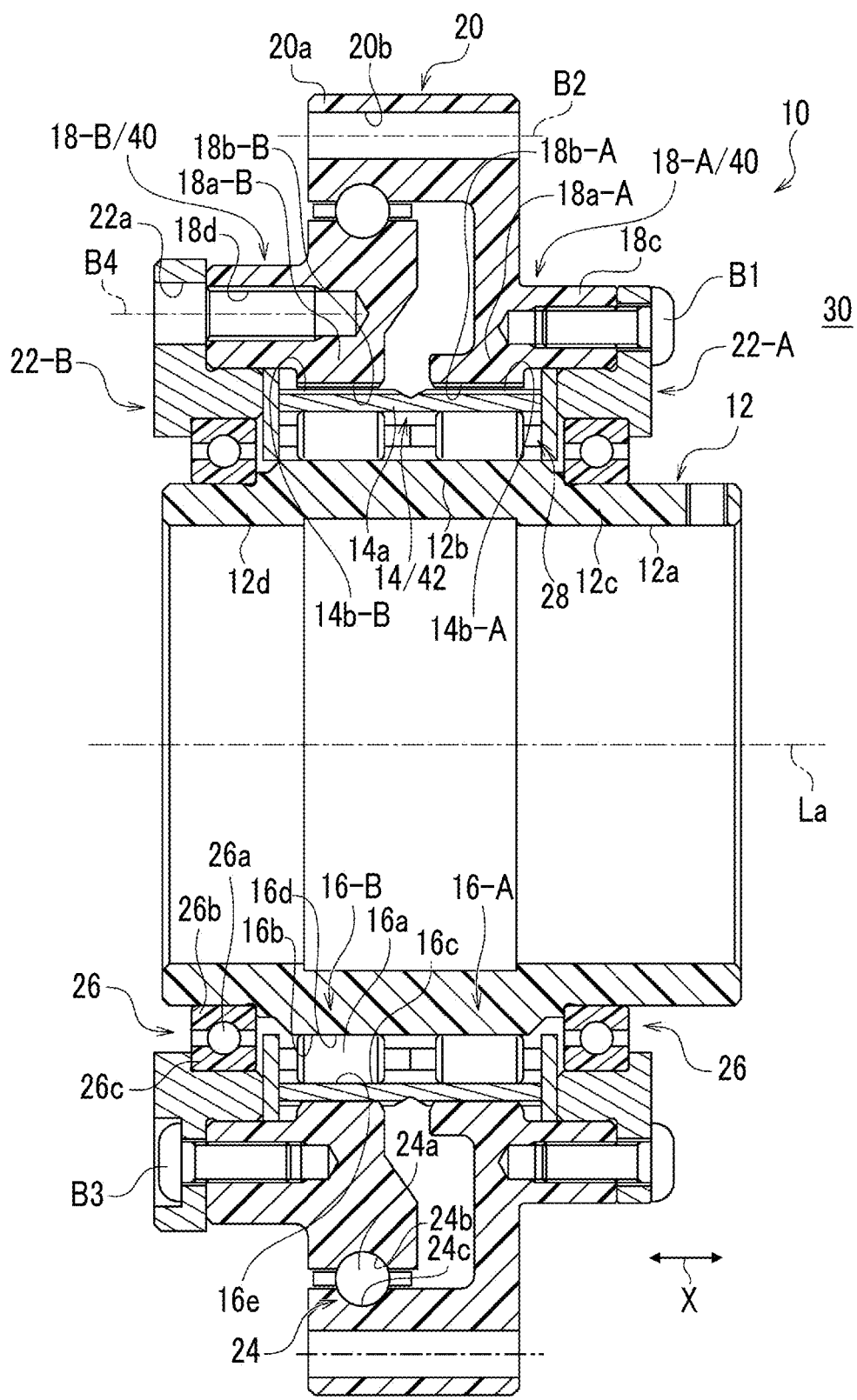
FIG. 4 is a side sectional view showing a gear device of a second embodiment.

FIG. 4 is a side sectional view showing a gear device 10 of a second embodiment. Similarly to the first embodiment, the external gear 14 of the present embodiment constitutes the high wear resistance gear 42, and the internal gear 18 constitutes the resin gear 40. Similarly to the first embodiment, the tooth thickness of the resin gear 40 (internal gear 18) is larger than the tooth thickness of the high wear resistance gear 42 (external gear 14).

The rolling element 16a of the present embodiment is a roller. The rolling element 16a of the present embodiment is a cylindrical roller whose outer peripheral surface is provided along the axial direction X. The rolling element 16a of the present embodiment rotates around a rotation axis along the axial direction X.

The first outer ring 16c of the present embodiment constitutes an inner peripheral surface of the external gear 14, and the inner peripheral surface constitutes an outer ring-side rolling surface 16e on which the first rolling elements 16a roll. The external gear 14 also functions as the first outer ring 16c of the wave generator bearing 16.

In order to increase the transmission efficiency of the bending meshing type gear device, it is effective to reduce a volume of a bending deformation location in order to reduce an energy loss at the bending deformation location. The inner peripheral surface of the external gear 14 constitutes an outer ring-side rolling surface 16e on which the rolling element 16a rolls, and the bending deformable first outer ring 16c is not provided separately from the external gear 14. Therefore, since the outer ring which is bent and deformed together with the external gear 14 is not separated from the external gear 14, the energy loss associated with the bending and deformation of the outer ring can be avoided, and high transmission efficiency of the gear device 10 can be achieved.

In addition, in a case where both the internal gear 18 and the external gear 14 are formed of a metal, in general, a flaking damage on the inner peripheral surface of the external gear 14 is more likely to occur earlier than wear on the tooth surface of the internal gear 18 or the external gear 14, and thus, this portion is a weakest portion having a lowest strength in the internal gear 18 and the external gear 14. Accordingly, in this case, in general, the outer ring of the wave generator bearing 16 is provided separately from the external gear 14, and thus, the improvement in the lift-span is achieved.

In the present embodiment, the internal gear 18 is formed of a resin, and the external gear 14 is formed of the high thermal conductivity material having the wear resistance higher than that of the resin for gear. In this case, the wear on the tooth surface of the internal gear 18 is more likely to progress than the flaking damage on the inner peripheral surface of the external gear 14. In particular, this tendency is stronger in a case where the high thermal conductivity material is a metal. Therefore, in the internal gear 18 and the external gear 14, the tooth surface of the internal gear 18 is the weakest portion, and the inner peripheral surface of the external gear 14 is not the weakest portion. Accordingly, as described above, in order to achieve high transmission efficiency of the gear device 10, even in the case where the outer ring of the wave generator bearing 16 is not provided separately from the external gear 14, there is an advantage in that an influence on the life-span can be eliminated.

Third Embodiment

Figure 5:
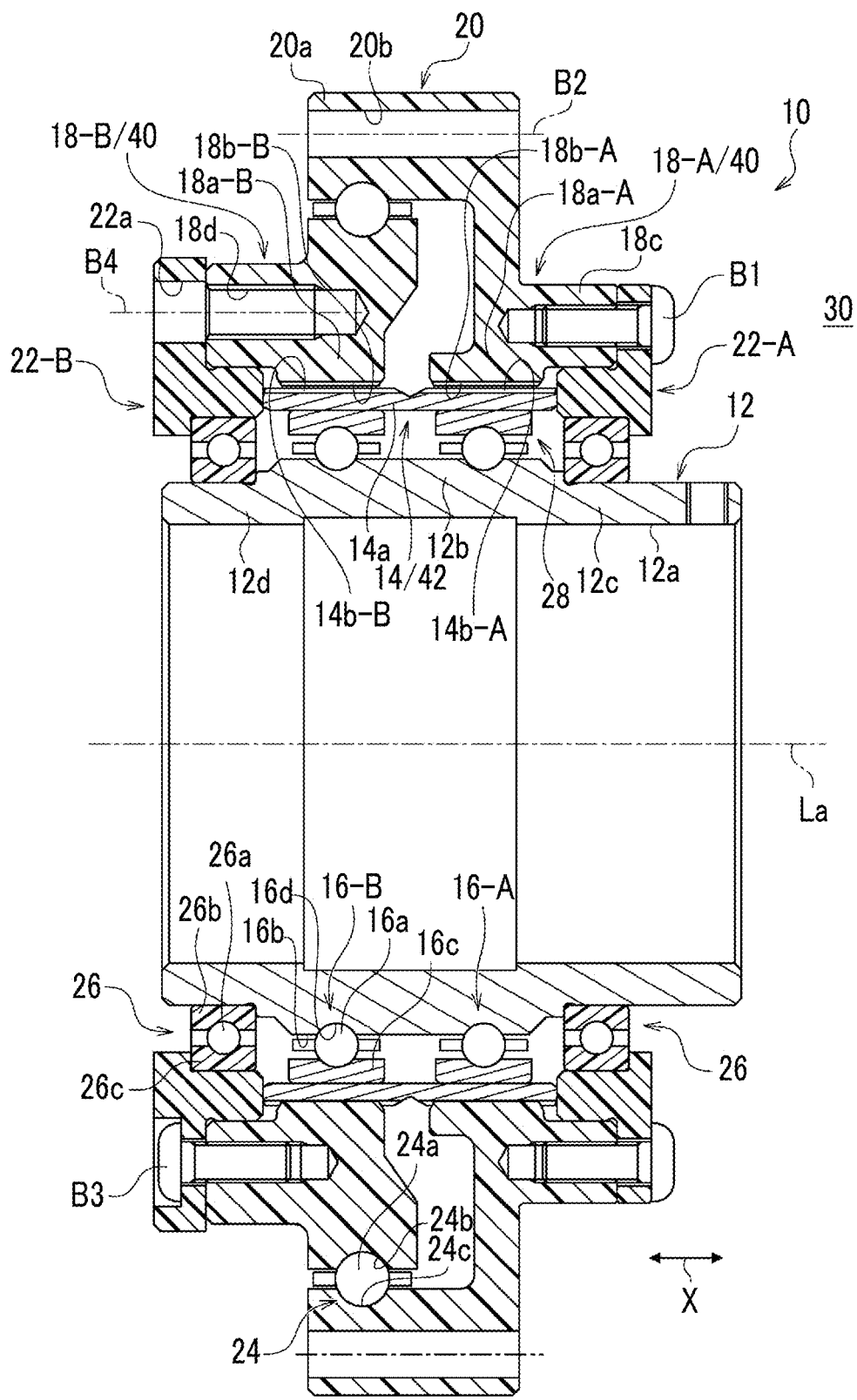
FIG. 5 is a side sectional view showing a gear device of a third embodiment.

FIG. 5 is a side sectional view showing a gear device 10 of a third embodiment. In the present embodiment, another device for promoting the heat dissipation of the external gear 14 located at the location where heat is easily accumulated will be described. In the first embodiment, the example in which the bearing housing 22 is formed of the high thermal conductivity material is described as such a device. In the present embodiment, in order to realize this device, the wave generator 12 and the wave generator bearing 16 are formed of the high thermal conductivity material instead of the bearing housing 22.

Specifically, in the present embodiment, each of the first rolling elements 16a and the first outer ring 16c of the wave generator bearing 16 and the wave generator 12 are formed of a metal as the high thermal conductivity material. In a case where the wave generator bearing 16 has the first inner ring 16b separated from the wave generator 12, the first inner ring 16b may also be formed of the high thermal conductivity material. In the present embodiment, as this high thermal conductivity material, a metal having the same thermal conductivity as that of the external gear 14 is used. However, a specific example of the high thermal conductivity material is not particularly limited as long as it has the thermal conductivity larger than that of the resin for gear. For example, the wave generator 12 and the wave generator bearing 16 may be formed using a material different from that of the external gear 14.

In addition, a portion of the wave generator 12 is exposed to the external space 30. Here, the exposed portion refers to outer peripheral surfaces on both end portions in the axial direction X of the wave generator 12, an end surface facing an outside in the axial direction X, or the like.

According to the-above-described configuration, the heat of the external gear 14 can be transferred to the wave generator 12 through the wave generator bearing 16 abutting against the external gear 14, and the heat of the external gear 14 can be dissipated from the wave generator bearing 16 or the wave generator 12. Therefore, an increase in the temperature of the internal gear 18 or the external gear 14 can be further suppressed by increasing the number of dissipation locations of the heat generated at the meshing location of the gear. In particular, heat dissipation can be performed from the wave generator 12 to the surrounding external space 30, and heat dissipation can also be performed from the wave generator 12 to the drive shaft of the drive device connected to the wave generator 12. Therefore, the heat dissipation from the external gear 14 disposed in the accommodation space 28 to the external space 30 or the drive shaft is promoted, and the increase in the temperature of the internal gear 18 or external gear 14 can be effectively suppressed.

Moreover, since the wave generator 12 is formed of a metal, the following advantages can be obtained. Generally, the wave generator 12 tends to have a large outer diameter, a large load is likely to be applied to the wave generator 12 as a bending moment increases, and thus, the strength required for the wave generator 12 also tends to increase. In this regard, since the wave generator 12 is formed of a metal, compared to the case where the wave generator 12 is formed of the resin for gear, the required strength of the wave generator 12 is easily secured. Accordingly, the required strength of the wave generator 12 is easily secured while achieving the weight reduction of the gear device 10 or the countermeasure with respect to the heat generation in the gear.

Similarly to the first embodiment, in the present embodiment, one of the external gear 14 and the internal gear 18 is formed of the resin for gear, and thus, it is possible to take the countermeasure with respect to the heat generation in the gear while achieving the weight reduction.

In addition, similarly to the first embodiment, the tooth thickness of the resin gear 40 (internal gear 18) is larger than the tooth thickness of the high wear resistance gear 42 (external gear 14). Accordingly, similarly to the first embodiment, the above-described various effects are obtained.

In the present embodiment, the bearing housing 22 is formed of the resin for gear. However, similarly to the first embodiment, the bearing housing 22 may be formed of the high thermal conductivity material. Further, in the present embodiment, other constituent elements such as the external gear 14, the internal gear 18, the main bearing 24, or the bearing 26 are formed of the same material as that of the first embodiment. That is, each of the external gear 14, the second rolling element 24a of the main bearing 24, and the third rolling element 26a of the bearing 26 are formed of a metal as the high thermal conductivity material, and each of the internal gear 18 and the third outer ring 26c and the third inner ring 26b of the bearing 26 is formed of the resin for gear.

Fourth Embodiment

Figure 6:
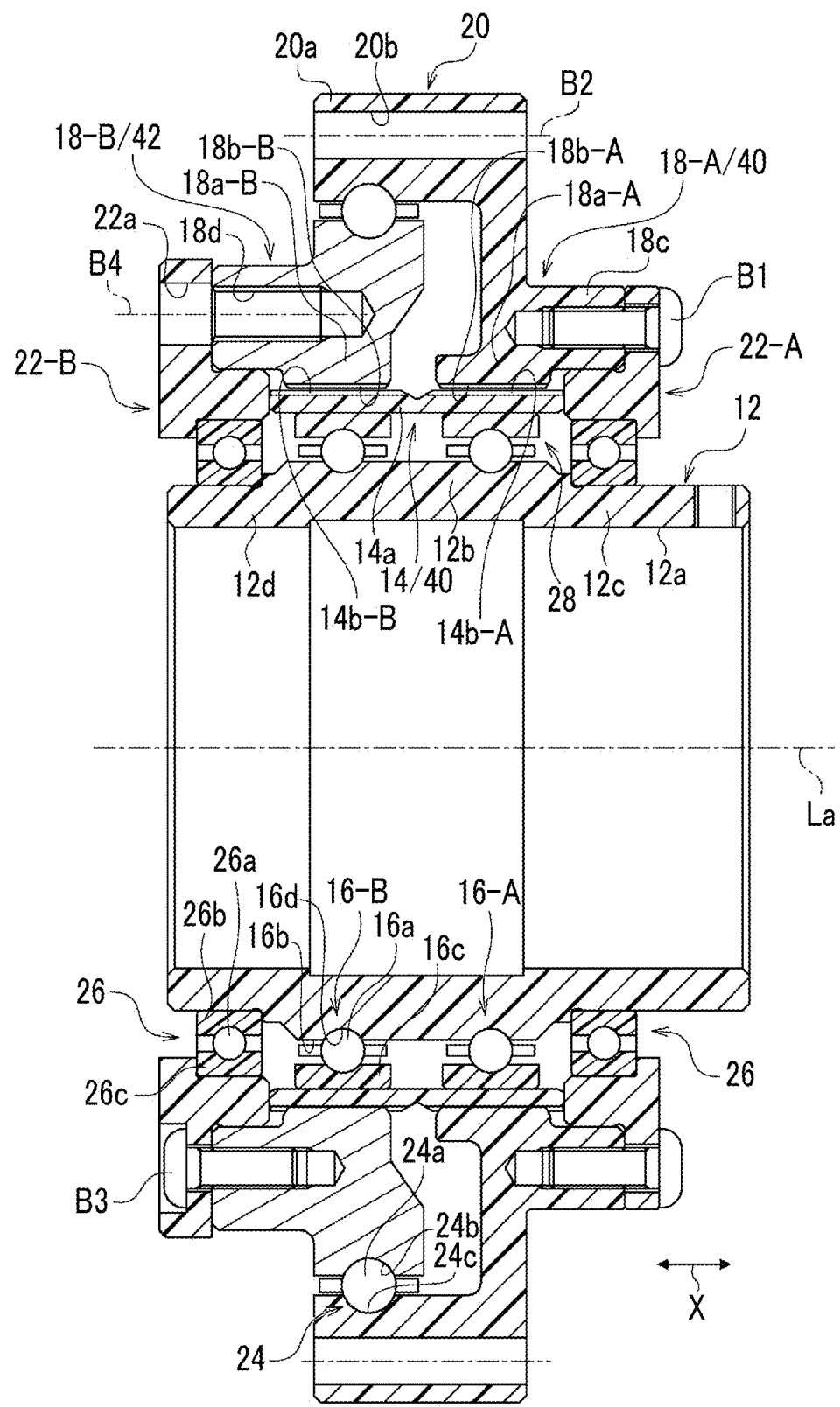
FIG. 6 is a side sectional view showing a gear device of a fourth embodiment.

FIG. 6 is a side sectional view showing a gear device 10 of a fourth embodiment. In the first to third embodiments, the example is described, in which the external gear 14 is formed of the high thermal conductivity material and the internal gear 18 is formed of the resin for gear. In the present embodiment, the external gear 14 is formed of the resin for gear, and the internal gear 18 is formed of the high thermal conductivity material. Specifically, the output internal gear 18-B of the internal gear 18 is formed of the high thermal conductivity material, and the decelerating internal gear 18-A is formed of the resin for gear. The external gear 14 and the decelerating internal gear 18-A constitute the resin gear 40, and the output internal gear 18-B constitutes the high wear resistance gear 42. Similarly to the first embodiment, in the present embodiment, the tooth thickness of the resin gear 40 (external gear 14) is larger than the tooth thickness of the high wear resistance gear 42 (decelerating internal gear 18-A). Accordingly, similarly to the first embodiment, the above-described various effects are obtained.

According to the present embodiment, when heat is generated in the meshing location between the internal gear 18 and the external gear 14, heat transfer from the meshing location to other locations through the output internal gear 18-B formed of the high thermal conductivity material is promoted, and heat dissipation at the other locations is promoted. Here, the other locations include locations other than the meshing location of the output internal gear 18-B. Accordingly, similarly to the contents described in the above (A), it is possible to suppress an increase in temperature of the output internal gear 18-B or the external gear 14 caused by heat generation in the meshing location between the output internal gear 18-B and the external gear 14. As a result, it is possible to prevent a decrease in a life-span of the internal gear 18-B or the external gear 14 due to influences of thermal deterioration, and favorable durability of the output internal gear 18-B or the external gear 14 can be obtained. Accordingly, one of the external gear 14 and the internal gear 18 is formed of the resin for gear, and thus, it is possible to take a countermeasure with respect to heat generation in the gear while achieving the weight reduction.

Moreover, since the output internal gear 18-B is formed of a metal which is the high thermal conductivity material, the following advantages can be obtained. Since the output internal gear 18-B is connected to the device to be driven, a bending moment may be applied to the output internal gear 18-B to tilt the rotation center line La from the device to be driven. Accordingly, a large load is easily applied to the meshing location of the external gear 14 and the rolling surface of the main bearing 24, and the required strength tends to be large. In this regard, since the output internal gear 18-B is formed of a metal, compared to a case where the output internal gear 18-B is formed of the resin for gear, the required strength of the output internal gear 18-B is easily secured. Accordingly, the required strength of the output internal gear 18-B is easily secured while achieving the weight reduction of the gear device 10 or the countermeasure with respect to the heat generation in the gear.

Moreover, in the gear device 10 of the present embodiment, in order to achieve the weight reduction, each of the first outer ring 16c of the wave generator bearing 16, the third outer ring 26c and the third inner ring 26b of the bearing 26, the wave generator 12, and the bearing housing 22 is formed of the resin. These may be formed of the resin for gear having the same thermal conductivity as that of the external gear 14, or may be formed of a different resin. Each of the first rolling element 16a of the wave generator bearing 16, the second rolling element 24a of the main bearing 24, and the third rolling elements 26a of the bearing 26 is formed of a metal. This is because the rolling element of the bearing requires a strength larger than those of the other locations. Moreover, similarly to the first and third embodiments, each of the bolts B1 and B3 of the present embodiment is formed of the metal as the high thermal conductivity material.

In the present embodiment, the example is described, in which only the output internal gear 18-B is formed of the high thermal conductivity material and the decelerating internal gear 18-A is formed of the resin for gear. In addition, both the decelerating internal gear 18-A and the output internal gear 18-B may be formed of the high thermal conductivity material, or only the decelerating internal gear 18-A may be formed of the high thermal conductivity material. Both the decelerating internal gear 18-A and the output internal gear 18-B may be formed of the high wear resistance gear 42, and only the decelerating internal gear 18-A may be formed of the high wear resistance gear 42. In any case, the external gear 14 is formed of the resin for gear.

Moreover, in the present embodiment, the example is described, in which each of the wave generator 12, the first outer ring 16c of the wave generator bearing 16, and the bearing housing 22 are formed of resin while the internal gear 18 is formed of the high thermal conductivity material. In this way, even in the case where the internal gear 18 is formed of the high thermal conductivity material, each of the wave generator 12, the wave generator bearing 16, and the bearing housing 22 may be formed of the metal, more specifically, the high thermal conductivity material.

Fifth Embodiment

Figure 7:
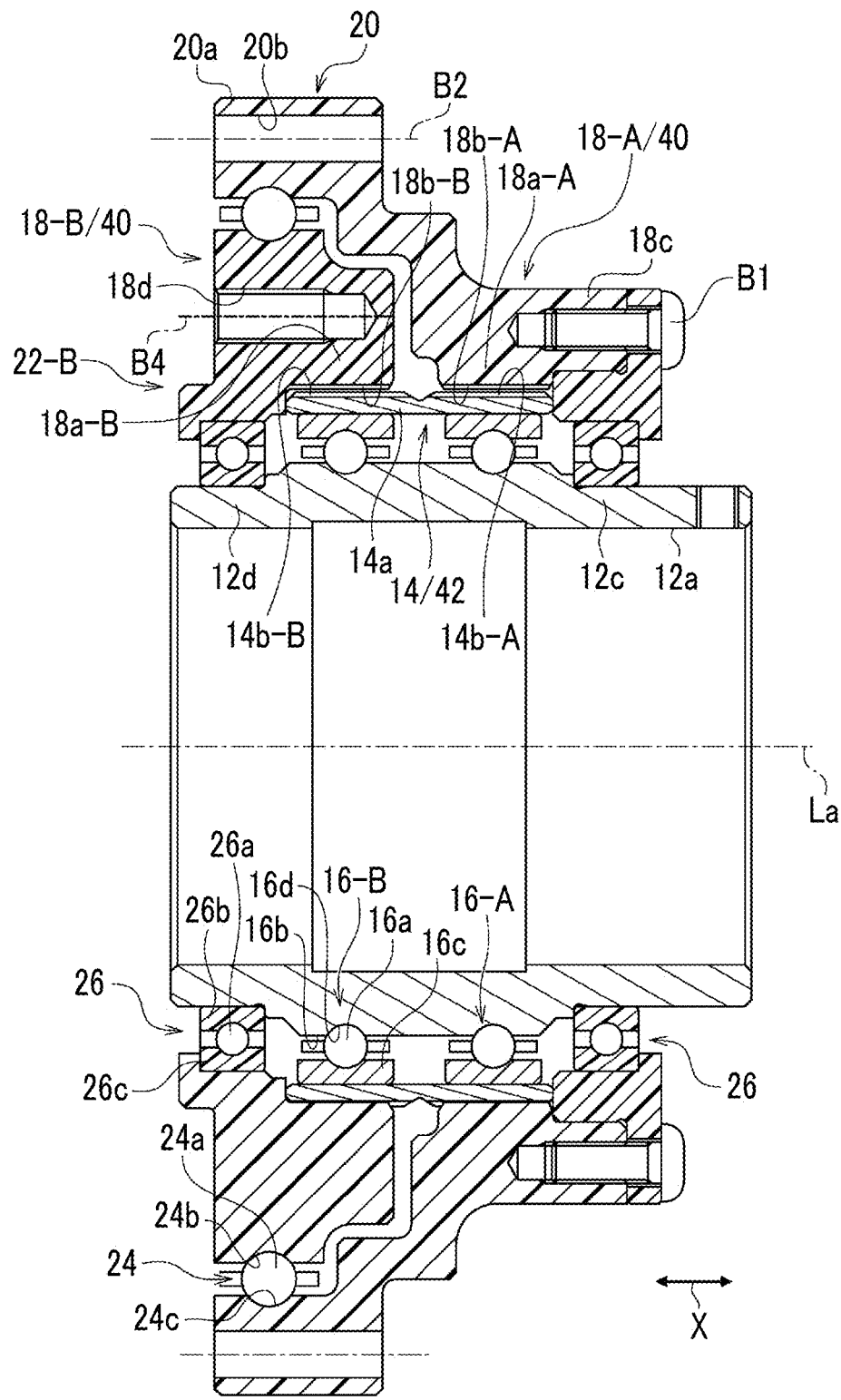
FIG. 7 is a side sectional view showing a gear device of a fifth embodiment.

FIG. 7 is a side sectional view showing a gear device 10 of a fifth embodiment. In the examples of FIGS. 1 to 6, the example in which the counter input-side bearing housing 22-B and the output internal gear 18-B are separated from each other is described.

In the present embodiment, the counter input-side bearing housing 22-B constitutes a portion of the same member as the output internal gear 18-B, and the counter input-side bearing housing 22-B and the output internal gear 18-B are integrated with each other. This means that the output internal gear 18-B also functions as the bearing housing 22. The output internal gear 18-B also functioning as the bearing housing 22 is formed of the resin for gear.

The combination of the resin for gear and the high thermal conductivity material is the same as the third embodiment in the other points. That is, each of the wave generator 12, the external gear 14, the first rolling elements 16a of the wave generator bearing 16, the second rolling element 24a of the main bearing 24, and the third rolling element 26a of the bearing 26 is formed of a metal as the high thermal conductivity material. Each of the input-side bearing housing 22-A, the decelerating internal gear 18-A, the first outer ring 16c of the wave generator bearing 16, and the third outer ring 26c and the third inner ring 26b of the bearing 26 is formed of a resin.

Similarly to other embodiments, in the present embodiment, one of the external gear 14 and the internal gear 18 is formed of the resin for gear, and thus, it is possible to take a countermeasure with respect to heat generation in the gear while achieving the weight reduction. In addition, similarly to the first embodiment, the tooth thickness of the resin gear 40 (internal gear 18) is larger than the tooth thickness of the high wear resistance gear 42 (external gear 14). Accordingly, similarly to the first embodiment, the above-described various effects are obtained.

Sixth Embodiment

Figure 8:
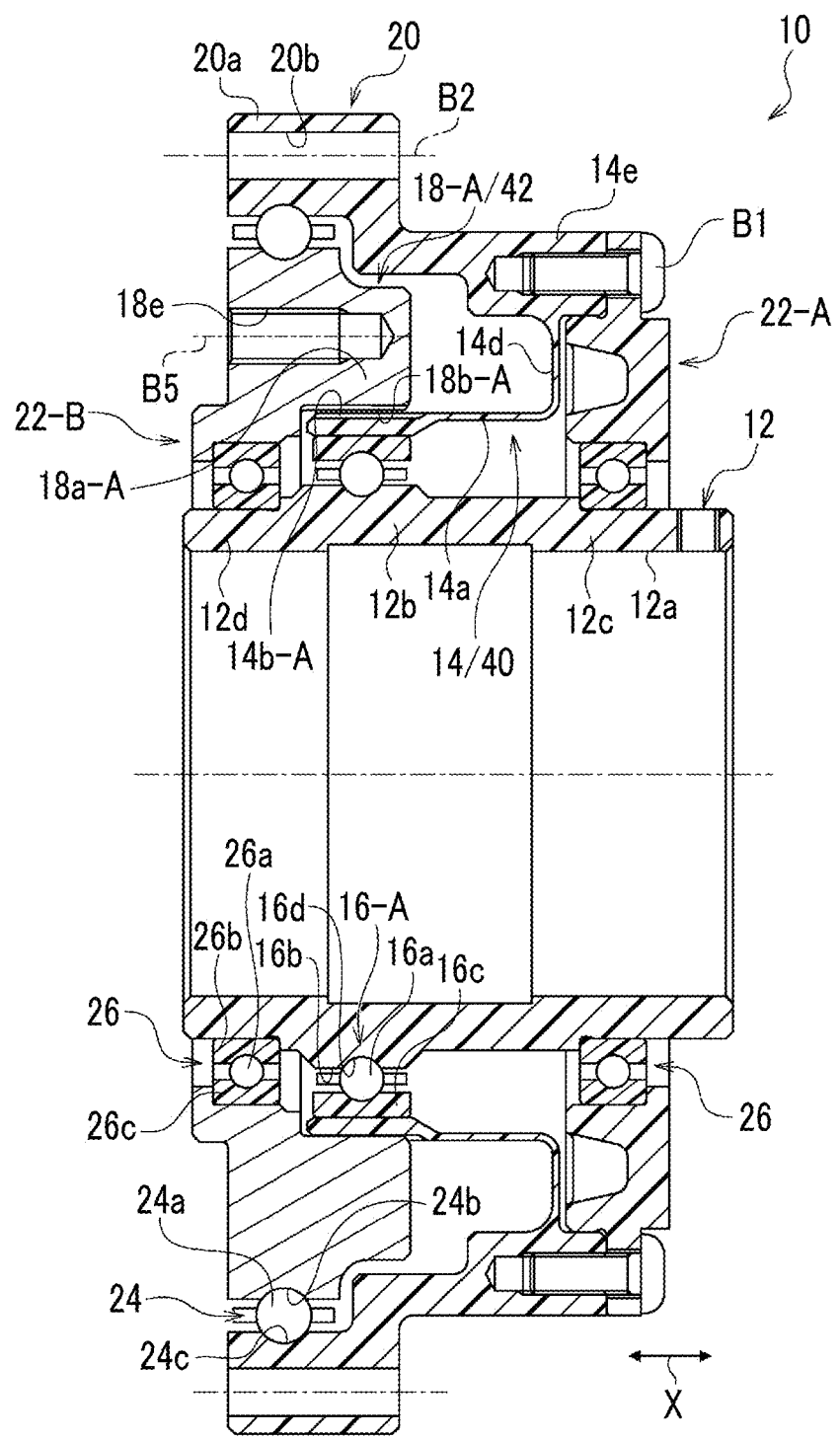
FIG. 8 is a side sectional view showing a gear device of a sixth embodiment.

FIG. 8 is a side sectional view showing a gear device 10 of a sixth embodiment. In the first to fifth embodiments, the tubular bending meshing type gear device is described. In the present embodiment, a so-called silk hat type bending meshing reduction gear will be described, which decelerates and outputs the rotation of the wave generator 12 using only a single decelerating internal gear 18-A without using the output internal gear 18-B.

The external gear 14 has a tubular external tooth base portion 14a and a flange portion 14d which protrudes radially outward from an input end portion of the external tooth base portion 14a. The external tooth base portion 14a and the flange portion 14d of the external gear 14 form a silk hat shape. A counter input-side portion of the external tooth base portion 14a is thicker than an input-side portion of the external tooth base portion 14a. The external gear 14 has first external teeth 14b-A integrally formed with the external tooth base portion 14a on an outer peripheral side of the counter input-side portion of the external tooth base portion 14a.

The external gear 14 has a connection portion 14e in which a bolt hole into which the bolt B1 is screwed is formed. The bolt B1 is used to connect the external gear 14 to the input-side bearing housing 22-A. The connection portion 14e is provided radially outside the flange portion 14d.

The external gear 14 is integrated with the support member 20 having the outer tubular portion 20a which rotatably supports the decelerating internal gear 18-A via the main bearing 24. In the present embodiment, the support member 20 and the external gear 14 constitutes a portion of a single member, and thus, are integrated with each other.

Similarly to the first embodiment, the decelerating internal gear 18-A is an annular member having stiffness. The decelerating internal gear 18-A is disposed on the outer peripheral side of the first external teeth 14b-A of the external gear 14. The decelerating internal gear 18-A has the first internal teeth 18b-A with which the first external teeth 14b-A of the external gear 14 mesh. Similarly to the first embodiment, the number of teeth of the first internal teeth 18b-A is larger than the number of teeth of the first external teeth 14b-A by 2i.

The decelerating internal gear 18-A is connected to the device to be driven using a bolt B5. The decelerating internal gear 18-A includes a female screw hole 18e into which the bolt B5 is screwed.

In the present embodiment, the counter input-side bearing housing 22-B constitutes a portion of the same member as the decelerating internal gear 18-A, and the counter input-side bearing housing 22-B and the decelerating internal gear 18-A are integrated with each other. This means that the decelerating internal gear 18-A also functions as the counter input-side bearing housing 22-B. A bearing 26 is disposed between the decelerating internal gear 18-A which also functions as the counter input-side bearing housing 22-B and the counter input-side shaft portion 12d of the wave generator 12.

An operation of the above-described gear device 10 will be described. If the drive shaft of the drive device rotates, the wave generator 12 rotates together with the drive shaft. If the wave generator 12 rotates, the external gear 14 is bent and deformed continuously to match the shape of the intermediate shaft portion 12b of the wave generator 12 while changing the meshing position with the decelerating internal gear 18-A in the circumferential direction. If the wave generator 12 rotates, a relative rotation corresponding to the difference in the number of teeth between the first external teeth 14b-A of the external gear 14 and the first internal teeth 18b-A of the decelerating internal gear 18-A is generated between the external gear 14 and the decelerating internal gear 18-A. In the present embodiment, the external gear 14 is fixed to the external member using the bolt B2. Accordingly, the decelerating internal gear 18-A is rotated with respect to the external gear 14 by the rotation of the wave generator 12, and the rotation of the decelerating internal gear 18-A is output to the device to be driven. In this case, the rotation of the wave generator 12 is decelerated by a reduction ratio corresponding to the difference in the number of teeth between the external gear 14 and the internal gear 18 and the decelerated rotation is output. As a result, the rotation of the wave generator 12 is decelerated, and the decelerated rotation is output from the decelerating internal gear 18-A to the device to be driven.

Here, in the gear device 10 of the present embodiment, the external gear 14 is formed of the resin for gear, and the decelerating internal gear 18-A is formed of the metal as the high thermal conductivity material. The external gear 14 constitutes the resin gear 40, and the decelerating internal gear 18-A constitutes the high wear resistance gear 42. Similarly to the first embodiment, the tooth thickness of the resin gear 40 (external gear 14) is larger than the tooth thickness of the high wear resistance gear 42 (decelerating internal gear 18-A). Accordingly, similarly to the first embodiment, the above-described various effects are obtained. In addition, since the support member 20 constitutes a portion of the same single member as the external gear 14, similarly to the external gear 14, the support member 20 is formed of the resin for gear.

The combination of the resin for gear and the high thermal conductivity material is the same as the fourth embodiment in the other points. That is, each of the wave generator 12, the first outer ring 16c of the wave generator bearing 16, the input-side bearing housing 22-A, and the third outer ring 26c and the third inner ring 26b of the bearing 26 is formed of a resin. Each of the first rolling element 16a of the wave generator bearing 16, the second rolling element 24a of the main bearing 24, and the third rolling elements 26a of the bearing 26 is formed of a metal. The bolt B1 is formed of a metal which is the high thermal conductivity material.

In the above-described gear device 10, one gear of the external gear 14 and the internal gear 18 is formed of the resin for gear, and the other gear is formed of the high thermal conductivity material. Accordingly, similarly to other embodiments, the resin for gear is used for the one gear, and thus, it is possible to take a countermeasure with respect to heat generation in the gear while achieving the weight reduction.

In addition, generally, the support member 20 which is disposed outside the decelerating internal gear 18-A is likely to have volume larger than that of the decelerating internal gear 18-A. In this embodiment, since the support member 20 and the external gear 14 are formed of the resin for gear, compared to the case where the support member 20 is formed of a metal, the weight reduction is effectively achieved.

In the present embodiment, the rotation of the wave generator 12 is decelerated using only the single decelerating internal gear 18-A without using the output internal gear 18-B, and the decelerated rotation is output. Accordingly, compared to the case where the output internal gear 18-B is used, the meshing locations between the internal gear 18 and the external gear 14 are reduced. This means that compared with the case where the output internal gear 18-B is used, the heat generation locations of the gear are reduced, and thus, the internal gear 18 and the external gear 14 are not easily heated. Therefore, the external gear 14 or the internal gear 18 is not easily subjected to influences of thermal deterioration, and it is possible to prevent the reduction of the life-span of the internal gear 18 or the external gear 14 due to the influence of the thermal deterioration.

In addition, in the present embodiment, the example is described, in which the decelerating internal gear 18-A is connected to the device to be driven, and the support member 20 integrated with the external gear 14 is fixed to the external member. In addition to this, the decelerating internal gear 18-A may be fixed to the external member, and the support member 20 integrated with the external gear 14 may be connected to the device to be driven. In this case, when the wave generator 12 rotates, the rotation of the wave generator 12 is decelerated by the external gear 14 and the decelerating internal gear 18-A, and thereafter, the decelerated rotation is output to the device to be driven through the external gear 14 and the support member 20.

Seventh Embodiment

Figure 9:
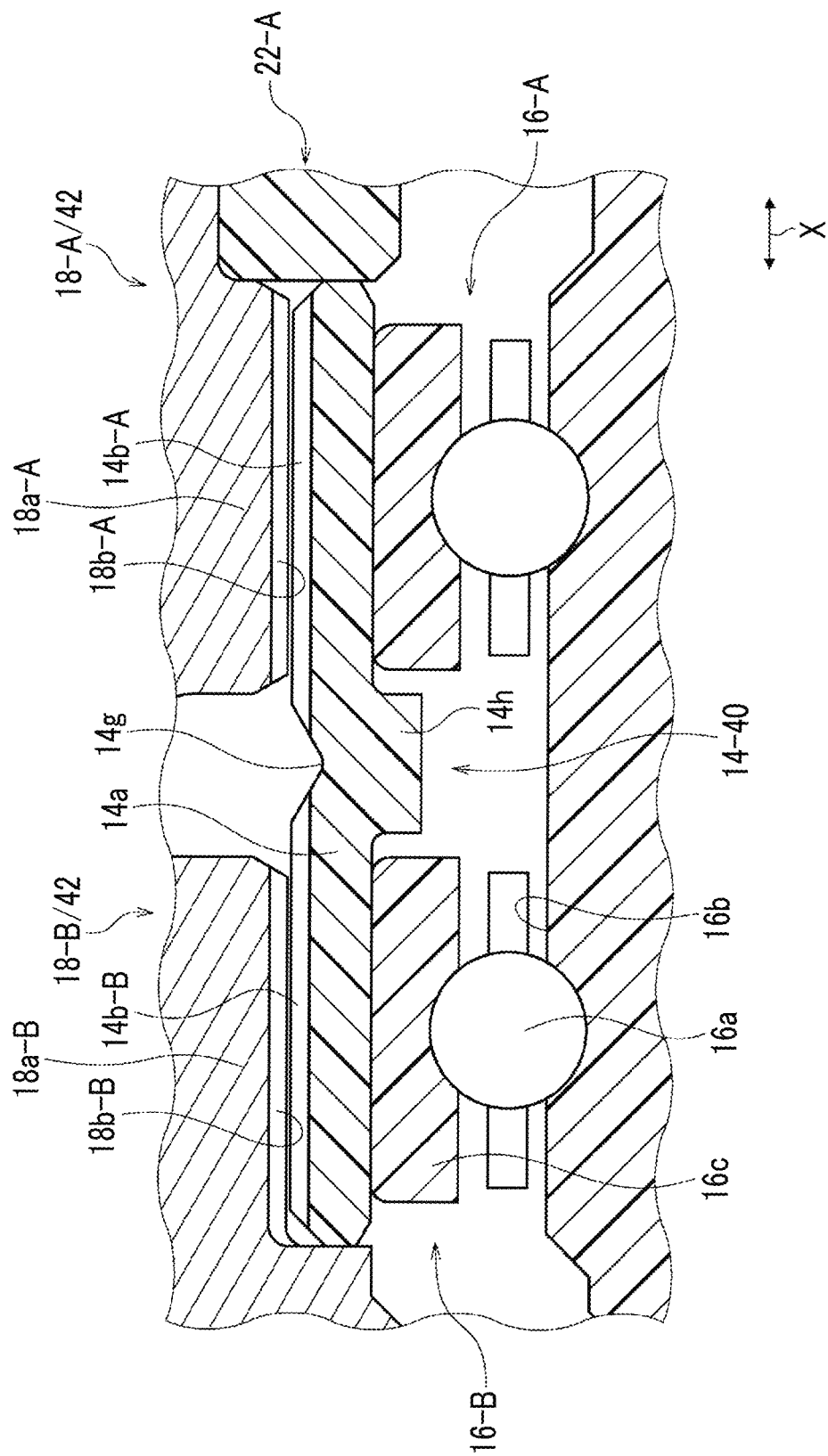
FIG. 9 is a partially enlarged view showing a gear device of a seventh embodiment.

FIG. 9 is a partially enlarged view showing a gear device 10 of a seventh embodiment. The gear device 10 of the present embodiment is mainly different from the gear device 10 of the fourth embodiment in the structure of the external gear 14.

Similarly the above-described embodiments, the external gear 14 has the external tooth base portion 14a, a first external teeth 14b-A which meshes with the first internal gear 18, and a second external teeth 14b-B which meshes with the second internal gear 18. In addition, similarly to the fourth embodiment, in the present embodiment, the external gear 14 is formed of the resin for gear, and each of the wave generator 12, the first outer ring 16c of the wave generator bearing 16, and the input-side bearing housing 22-A are formed of a resin. In addition, each of the decelerating internal gear 18-A, the output internal gear 18-B, and the first rolling elements 16a of the wave generator bearing 16 is formed of a metal as the high thermal conductivity material. The external gear 14 constitutes the resin gear 40, and the internal gears 18-A and 18-B constitute the high wear resistance gear 42. Similarly to the first embodiment, the tooth thickness of the resin gear 40 (external gear 14) is larger than the tooth thickness of the high wear resistance gear 42 (internal gear 18). Accordingly, similarly to the first embodiment, the above-described various effects are obtained.

When the first external teeth 14b-A and the second external teeth 14b-B of the external gear 14 mesh with the first internal gear 18 or the second internal gear 18, mutually opposing circumferential forces are applied to the first external teeth 14b-A and the second external teeth 14b-B of the external gear 14. As a result, the tooth surfaces of the first external teeth 14b-A and the second external teeth 14b-B are easily twisted, and thus, a partial contact easily occurs, in which the tooth surfaces of the first external teeth 14b-A and the second external teeth 14b-B strongly abut against only a portion of the tooth surface of each of the internal teeth 18b-A and 18b-B of the internal gear 18.

As a countermeasure with respect to this, the external gear 14 has a groove portion 14g provided between the first external teeth 14b-A and the second external teeth 14b-B. The groove portion 14g is provided so as to include s radial range from a tooth tip to a tooth bottom of each of the first external teeth 14b-A and the second external teeth 14b-B, and separates the first external teeth 14b-A and the second external teeth 14b-B from each other in the axial direction X. Accordingly, even in a case where the mutually opposing circumferential forces are applied to the first external teeth 14b-A and the second external teeth 14b-B, the effects of the forces are difficult to mutually extend, and it is possible to suppress occurrence of the partial contact.

Here, the external gear 14 of the present embodiment has a convex portion 14h, which is provided on an inner peripheral side of the external gear 14, radially inside the groove portion 14g. The convex portion 14h protrudes radially inward from the external tooth base portion 14a. The convex portion 14h is provided radially inside the groove portion 14g in a range over the entire length of the axial direction X of the groove portion 14g. That is, when viewed in the radial direction, the convex portion 14h is disposed so as to overlap the groove portion 14g in a range over the entire length of the groove portion 14g. The convex portion 14h is disposed between the first wave generator bearing 16-A and the second wave generator bearing 16-B.

Accordingly, a portion around the groove portion 14g of the external gear 14 can be reinforced by the convex portion 14h, and it is possible to improve the strength against distortion of the portion around the groove portion 14g. In addition, there is an advantage that reinforcement can be made without causing an increase in the circumferential dimension of the external gear 14 between the wave generator bearing 16 and the internal gear 18. Moreover, there is another advantage that a space between the first wave generator bearing 16-A and the second wave generator bearing 16-B can be used for reinforcement. In addition, the external gear 14 is formed of the resin for gear, and it is difficult to secure the strength compared to a metal. However, there is an advantage that the strength can be secured by the convex portion 14h.

In addition, in the present embodiment, the example is described, in which the external gear 14 having the convex portion 14h is formed of the resin for gear. However, the external gear 14 having the convex portion 14h may be formed of the high thermal conductivity material, specifically, a metal.

It should be understood that the invention is not limited to the above-described embodiment, but may be modified into various forms on the basis of the spirit of the invention. Additionally, the modifications are included in the scope of the invention. In the above-described embodiments, descriptions of "of the embodiment", "in the embodiment" and the like are given with respect to the contents which can be changed in design. However, it is not unreasonable that design changes cannot be tolerated for contents without the descriptions. In addition, the hatching attached to the cross sections of the drawings does not limit a material of a hatched object.

In the constituent elements of the gear device 10, as long as one gear of the external gear 14 and the internal gear 18 is formed of resin and the other gear is formed of the high thermal conductivity material, materials of the other constituent elements are not particularly limited. For example, as the constituent elements other than the external gear 14 and the internal gear 18, there is the wave generator 12, the wave generator bearing 16, the main bearing 24, the bearing housing 22, the bearing 26, the bolts B1 and B3, or the like. However, theses can use any one of the resin and the high thermal conductivity material regardless of the materials of the external gear 14 and the internal gear 18.

The type of the bending meshing type gear device is not particularly limited, and in addition to the tubular type bending meshing type gear device and the silk hat type bending meshing type gear device, a so-called cup type bending meshing type gear device or the like may be used.

The example is described in which the decelerating internal gear 18-A and the support member 20 constitutes a portion of a single member, and thus, are integrated with each other. In addition, the decelerating internal gear 18-A and the support member 20 may be provided separately from each other, and may be connected to each other to be integrated with each other.

The example in which the abutment member is the bearing housing 22 is described. However, a specific example of the abutment member is not particularly limited as long as it abuts against the external gear 14.

In the third to seventh embodiments, the outer ring-side rolling surface 16e may be provided on the inner surface of the external gear 14.

In the case where the internal gear 18-A and 18-B are formed of a resin and the external gear 14 is formed of the high thermal conductivity material, in the embodiments, the example is described in which the tooth thicknesses of both the internal gear 18-A and 18-B are larger than the tooth thickness of the external gear 14. However, the present invention is not limited to this. In this case, the tooth thickness of at least one of the internal gears 18-A and 18-B may be larger than the tooth thickness of the external gear 14.

Moreover, in the case where the internal gears 18-A and 18-B are formed of the high thermal conductivity material and the external gear 14 is formed of a resin, the tooth thickness of the external gear 14 may be greater than the tooth thickness of at least one of the internal gears 18-A and 18-B.

What is claimed is:

1. A bending meshing gear device comprising:
   a wave generator;
   an external gear which is bent and deformed by the wave generator; and
   an internal gear which meshes with the external gear,
   wherein the internal gear is formed of a resin,
   wherein the external gear is formed of a metal a having a thermal conductivity higher than that of the resin and wear resistance higher than that of the resin,
   wherein a tooth thickness of the internal gear is larger than a tooth thickness of the external gear in a meshing range of the external gear and the internal gear, and
   wherein the tooth thickness is a dimension of a tooth in a direction orthogonal to a tooth length direction and a tooth trace direction.

2. The bending meshing gear device according to claim 1, wherein in the meshing range, a minimum value of the tooth thickness of the internal gear is larger than a minimum value of the tooth thickness of the external gear.

3. The bending meshing gear device according to claim 1, wherein at a center position of the meshing range in the tooth length direction, the tooth thickness of the internal gear is larger than the tooth thickness of the external gear.

4. The bending meshing gear device according to claim 1, wherein in the meshing range, a minimum value of the tooth thickness of the internal gear is equal to or more than a maximum value of the tooth thickness of the external gear.

5. The bending meshing gear device according to claim 1, further comprising:
   a wave generator bearing which is disposed between the wave generator and the external gear,
   wherein an inner peripheral surface of the external gear constitutes an outer ring-side rolling surface on which a rolling element of the wave generator bearing rolls.

6. The bending meshing gear device according to claim 5, wherein an outer peripheral surface of the wave generator constitutes an inner ring-side rolling surface on which the rolling element of the wave generator bearing rolls.

7. A bending meshing gear device comprising:
   a wave generator;
   an external gear which is bent and deformed by the wave generator;
   an internal gear which meshes with the external gear; and
   an abutment member provided in contact with the external gear,
   wherein the internal gear is formed of a resin,
   wherein the external gear is formed of a high thermal conductivity material having a thermal conductivity higher than that of the resin and wear resistance higher than that of the resin,
   wherein a tooth thickness of the internal gear is larger than a tooth thickness of the external gear in a meshing range between the external gear and the internal gear, and wherein the tooth thickness is a dimension of the internal gear or the external gear in a direction orthogonal to a tooth length direction and a tooth trace direction, wherein the abutment member is formed of a high thermal conductivity material having a thermal conductivity higher than that of the resin, and wherein a portion of the abutment member is exposed to an external space of the bending meshing gear device.

8. The bending meshing gear device according to claim 7, wherein the abutment member is a bearing housing in which a bearing supporting the wave generator is disposed.

9. The bending meshing gear device according to claim 1, further comprising:

a bolt for connecting the internal gear and another member, wherein the bolt is formed of a high thermal conductivity material having a thermal conductivity higher than that of the resin.

10. The bending meshing gear device according to claim 1, further comprising:

a wave generator bearing disposed between the wave generator and the external gear, wherein the wave generator and the wave generator bearing are formed of a high thermal conductivity material having a thermal conductivity higher than that of the resin.

* * * * *